D. A. LEWIS.
HEAT DISTRIBUTING ATTACHMENT.
APPLICATION FILED MAR. 20, 1915.
1,164,368.
Patented Dec. 14, 1915.
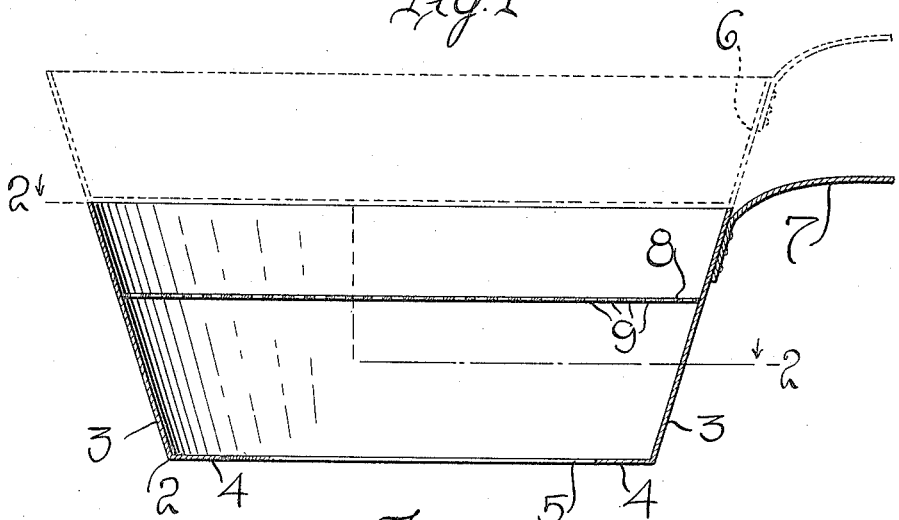
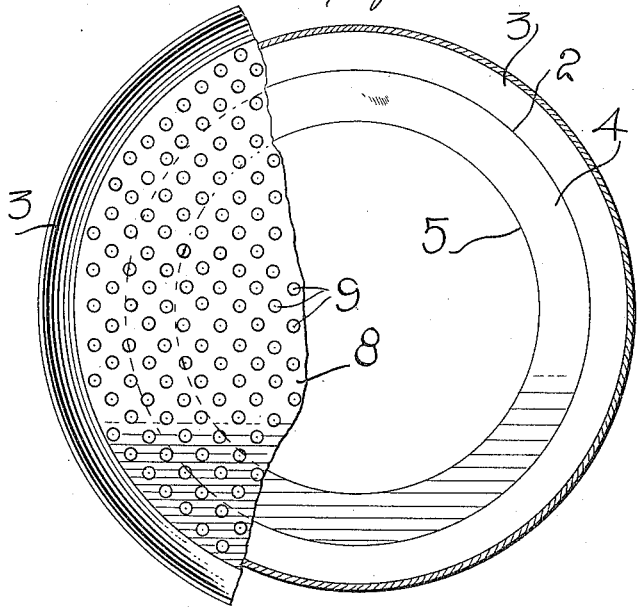
Witnesses
Robert M. Sutphen
A. I. Hind
Inventor
D. A. Lewis
By Watson E. Coleman
Attorney

UNITED STATES PATENT OFFICE.

DORMAN A. LEWIS, OF LOS ANGELES, CALIFORNIA.

HEAT-DISTRIBUTING ATTACHMENT.

1,164,368.  Specification of Letters Patent.  Patented Dec. 14, 1915.

Application filed March 20, 1915. Serial No. 15,911.

*To all whom it may concern:*

Be it known that I, DORMAN A. LEWIS, a citizen of the United States, residing at Los Angeles, in the county of Los Angeles and State of California, have invented certain new and useful Improvements in Heat-Distributing Attachments, of which the following is a specification, reference being had to the accompanying drawings.

My invention relates to attachments for gas, oil, or coal burning stoves, and particularly to attachments whereby a cooking utensil may be supported above the burner of an oil or gas stove and above the opening of a fire-pot and the heat rising from the burning fuel may be conserved and equally distributed beneath the bottom of the cooking utensil.

The main object of this invention is to provide a support or cooking utensil of the character described adapted to support the various articles such as sauce pans, frying pans, kettles, etc., and particularly adapted to prevent waste of the heat passing upward to said utensil, and also particularly adapted to distribute this heat uniformly beneath the utensil so that all parts of it may be heated to the same degree and thus scorching be prevented.

A further object of the invention is to provide a base, as it may be termed, adapted to rest upon a stove of the character described and support a utensil above it, this base being provided with a perforated partition extending transversely across the base and act as a heat distributer.

A still further object of the invention is to provide a very simple device of the above character, which may be readily made from cheap material and which is adapted to be used on all ordinary stoves.

Other objects will appear in the course of the following description.

My invention is illustrated in the accompanying drawings, wherein:

Figure 1 is a vertical diametrical section of a heat distributing attachment of the character described. Fig. 2 is a section on the line 2—2 of Fig. 1.

Referring to these drawings, 2 designates the base of my attachment, which base may be cast or otherwise formed, but is, preferably made of sheet metal such as aluminum. This base is illustrated as having upwardly flaring side walls 3, but I do not wish to be limited to this construction. The lower end of the base is formed by an annular flange 4 extending inward from the side walls and defining an opening 5, ordinarily about six inches in diameter, the exterior diameter of the base at its bottom being preferably about eight inches. The upper end of this base 2 is open and adapted to support any suitable cooking utensil which is designated generally 6. The base is preferably provided with a handle 7 whereby it may be readily moved or shifted.

The most important feature of my invention resides in the distributing plate 8, which extends across the interior of the base about midway between the bottom and top thereof, and which is provided with a plurality of small heat distributing perforations 9. Preferably this heat distributing plate 8 is disposed nearer to the upper end of the base 2 than the bottom end thereof. Preferably the heat distributing plate 8 is permanently attached to or formed with the base, but I do not wish to limit myself to this as this plate might simply be inserted within the base and rest loosely therein so that it may be removed and cleansed if necessary.

In the operation of my invention it will be observed that the heat arising through the opening 5 will be directed upward to the bottom of the pan or other cooking utensil, and that this heat cannot escape from around the bottom of the utensil but is confined by the wall 3. Furthermore, the plate 8 acts as a baffle-plate, and particularly acts to thoroughly distribute the heat arising through the opening 5 so that the space above the plate will be uniformly heated and the bottom of the pan or utensil will be uniformly heated.

This device is particularly intended for use on gas or oil stoves, though not necessarily restricted to such use, and I have found in actual practice that from 25% to 50% of the gas, as used in the ordinary manner, may be saved, and at the same time all parts of the bottom of the utensil will have the same heat. Preferably the bottom of the base 2 will have a size the same as that of the standard No. 8 cook stove lid, so that the base may be used on the coal or wood stove with the same satisfactory results as when used on a gas burning stove.

Having thus described my invention, what I claim is:

1. An attachment of the character described comprising a base having an upwardly and outwardly extending circular wall, the bottom of the base being formed from an inwardly extending annular flange defining a central opening, said base being adapted to support a utensil at its upper end, and a perforated plate extending transversely across said base above the lower end of the wall and acting as a heat distributer.

2. An attachment of the character described comprising a base having an upwardly and outwardly flaring circular wall, the lower end of the wall having an inwardly extending annular flange defining a central heat-receiving opening, the upper end of said wall being adapted to receive and support a cooking utensil, a uniformly perforated heat distributing plate disposed within said base and entirely intermediate the bottom and the top thereof permanently secured to the wall and extending entirely across the base and a handle rigidly attached to the wall.

In testimony whereof I hereunto affix my signature in the presence of two witnesses.

DORMAN A. LEWIS.

Witnesses:
  WALTER J. BAILEY,
  ALBERT ESTERGAARD.

Copies of this patent may be obtained for five cents each, by addressing the "Commissioner of Patents, Washington, D. C."